No. 787,791. PATENTED APR. 18, 1905.
G. H. REYNOLDS.
PIPE COUPLING.
APPLICATION FILED AUG. 29, 1904.
2 SHEETS—SHEET 2.
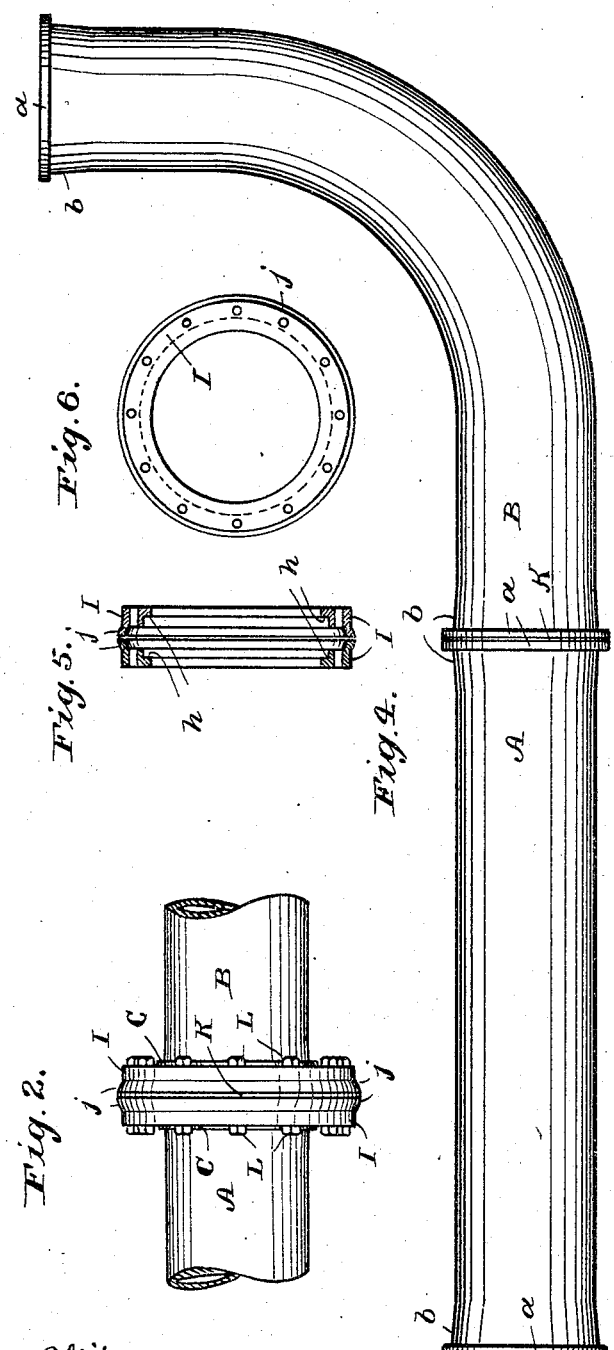
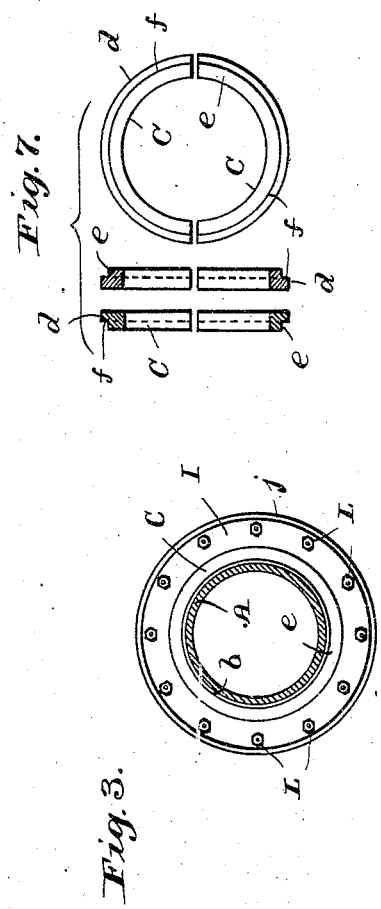
Witnesses
William V. Devitt
R. H. Newman
Inventor
George H. Reynolds
By Chamberlain & Newman
Attorneys No. 787,791. Patented April 18, 1905.

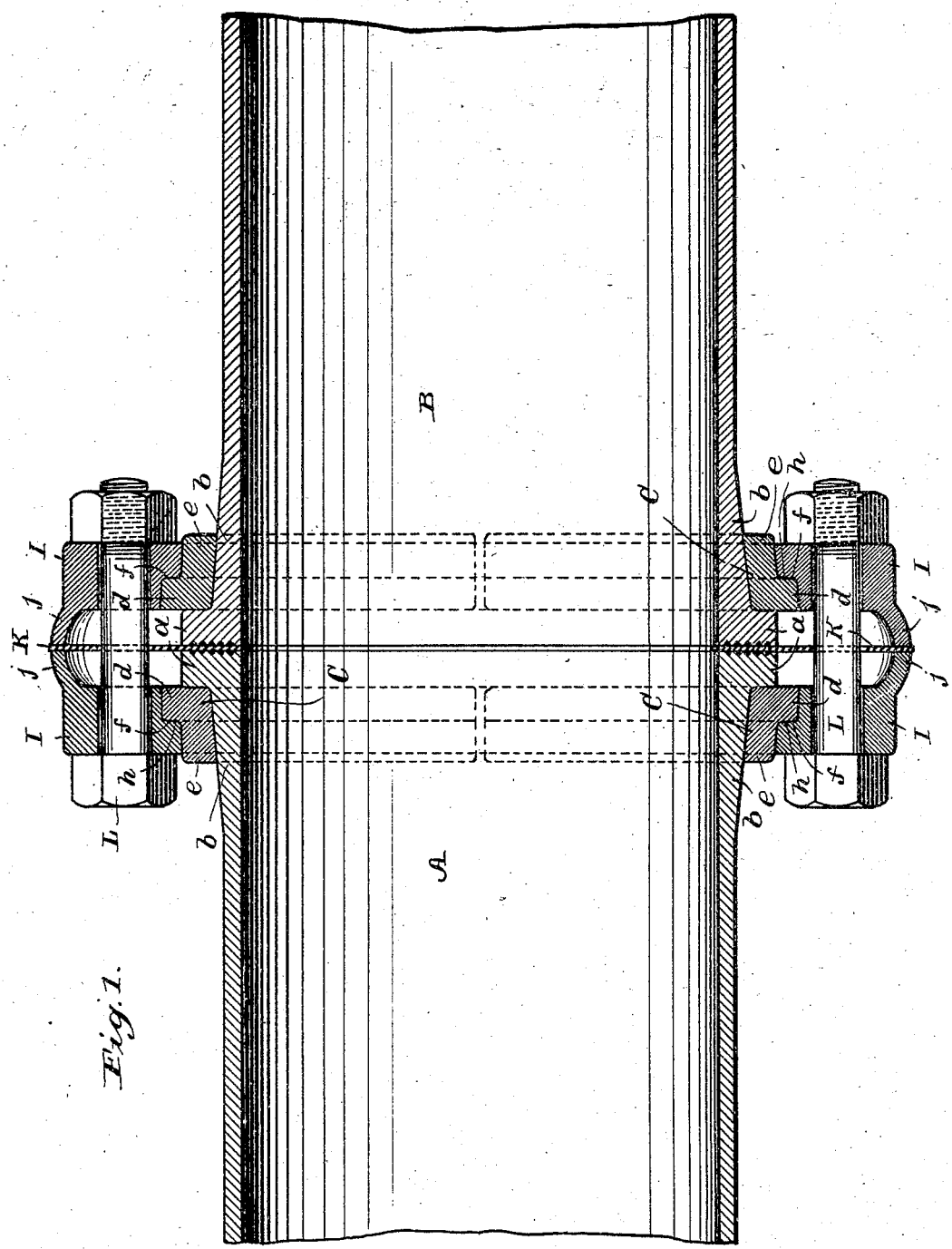

UNITED STATES PATENT OFFICE.

GEORGE H. REYNOLDS, OF MANSFIELD DEPOT, CONNECTICUT.

PIPE-COUPLING.

SPECIFICATION forming part of Letters Patent No. 787,791, dated April 18, 1905.

Application filed August 29, 1904. Serial No. 222,545.

*To all whom it may concern:*

Be it known that I, GEORGE H. REYNOLDS, a citizen of the United States, and a resident of Mansfield Depot, in the county of Tolland and State of Connecticut, have invented certain new and useful Improvements in Pipe-Couplings, of which the following is a specification.

This invention relates to new and useful improvements in pipe-couplings such as are required to join together sections of high-pressure steam or hydraulic pipe.

For certain classes of pipe it is desirable to have a strong coupling of the above class which can be attached when placing the pipe in position and which may properly be termed a "detachable" coupling, thus permitting the employment of smooth sections of pipe free from the usual connected coupling members, which are non-detachable.

It is the object of my invention to provide a strong and durable pipe coupling or joint which may be attached over the flanged ends of wrought-iron or steel pipes in a way to securely unite the same, to construct said coupling in a manner that will permit of its quick and convenient assemblage on and removal from the pipe, so that it will draw the two ends of the two sections of pipe together, to produce it in a way that will strengthen the pipe adjacent to the flange instead of weakening it, as is usually the case, and, finally, to provide a coupling which will be comparatively inexpensive to manufacture.

With the above and other minor objects in view my invention resides and consists in the novel construction and combination of parts shown upon the accompanying two sheets of drawings, forming a part of this specification, upon which similar characters of reference denote like or corresponding parts throughout the several figures, and of which—

Figure 1 shows a longitudinal sectional view through my improved coupling complete, including the ends of two pipe-sections. Fig. 2 shows a side elevation, on a reduced scale, of my improved coupling attached to the connected ends of two pipe-sections. Fig. 3 is a sectional end view of the construction shown in Fig. 2. Fig. 4 shows two sections of pipe, one straight and the other bent, such as my coupling is designed to be used upon. Figs. 5 and 6 show vertical cross-sectional views and a side view, respectively, of the outer or clamping rings of my coupling; and Fig. 7 shows vertical cross-sectional views and a side view of the sectional bushing-ring, which fits inside of the outer or clamping ring.

Referring in detail to the characters of reference marked upon the drawings, A and B represent two sections of pipe, one of which represents a bent section and the other a straight pipe. These sections may, however, be alike in shape so far as the application of my improved coupling is concerned, or either or both may be bent into other shapes from that shown by B in Fig. 4 of the drawings. In manufacturing these pipes are first forged by means of a press having suitable dies to form the flanges *a* and reinforcements *b* on the ends and may then be bent to any shape desired. These flanges and reinforcements are alike on all the different shapes of pipes and likewise similar on each end, thus permitting the ends of any of the various styles or shapes to be similarly connected. The reinforcements *b* shown adjacent to the flange *a* are preferably formed on the outside of the pipe, and its surface may be tapering in form, as shown, or straight, if preferred. To be effective, however, it should be slightly heaviest adjacent to the flange, as that is naturally where the pipe is most liable to rupture.

The parts of the coupling comprise two sectional rings or bushings C, having an enlarged inner edge *d* and a reduced outer edge *e*, forming a transverse shoulder *f*. These shoulders are engaged by similar or correspondingly shaped shoulders *h* on the inner side of clamping-rings I I, forming the outer members of the coupling. The inner diameter of these clamping-rings is of a diameter greater than that of the outer diameter of the flange of the pipes, thus allowing the rings to freely pass over said flanges in the attachment and assembling of the parts. The clamping-rings I are each provided with a flange *j*, which is comparatively thin and disposed outwardly in a manner to register with each other. A packing ring or washer K, preferably of soft copper, is placed intermediate of the serrated ends of the pipes and the flanges of the outer rings in a manner to be squeezed together by the tightening of the bolts of the clampings-rings and to form an operative tight joint. The rings I are drawn together by nutted bolts L passing therethrough, of which there may be any desired number placed at an equal distance apart around the coupling. The purpose of the outwardly-deflected flange on the rings is to provide a contact that will give slightly when the bolts are firmly tightened, thus affording the tightest grip or connection in the joint proper between said pipes.

In the use of my coupling the parts are attached after the pipes have been received on the job and may be connected during the placement of the several sections in position. In practice the outer or clamping rings are first slipped over the flanged ends of the pipe, after which the bushings or sectional rings are placed inside of said outer rings. The two assembled rings are then shoved together against a suitable packing-washer, when the bolts are put in place and screwed up tight.

Having thus described my invention, what I claim, and desire to secure by Letters Patent, is—

1. In a pipe-coupling, the combination with the flanged ends of pipes, of sectional rings to encircle the pipe and engage the back of said flanges, rings for holding the sections together and each bearing an outwardly-disposed flange to register with that of the other, a packing-ring intermediate of and engaged by the ends of the pipes, and means for drawing the rings and ends of pipes together.

2. A pipe-coupling comprising sectional rings to engage the back of a pipe-flange and having an enlarged inner edge and reduced outer edge forming a shoulder, clamping-rings containing a corresponding shoulder on its inner face to engage the shoulders of the sectional rings, and inwardly-disposed flanges on their outer edges adapted to register with each other, a packing-ring intermediate of both the pipe and ring flanges, and bolts to draw the parts together.

3. In a pipe-coupling the combination with pipes having their ends provided with flanges and reinforcements adjacent thereto, of sectional rings encircling the pipe and the backs of the flanges, rings encircling the sectional rings and bearing forwardly-disposed flanges, a packing-ring intermediate of the flanges of the rings and the ends of the pipes and bolts to draw the parts together.

4. In a pipe-coupling, the combination with forged pipes having flanged and reinforced ends, of attachable sectional rings to engage the flanges of the pipes and bearing-shoulders, complete rings bearing shoulders corresponding with the shoulders of the sectional rings and an annular projection from said complete ring, and means for securing the parts together.

Signed at Bridgeport, in the county of Fairfield and State of Connecticut, this 25th day August, A. D. 1904.

GEORGE H. REYNOLDS.

Witnesses:
C. M. NEWMAN,
WILLIAM V. DEVITT.